Nov. 22, 1955  D. O. BERESFORD  2,724,498
DEVICE FOR SEPARATING MIXED MASSES OF SPHERICAL
AND IRREGULARLY SHAPED BODIES SUCH AS
SEEDS, GRAINS AND THE LIKE
Filed Nov. 18, 1954  2 Sheets-Sheet 1
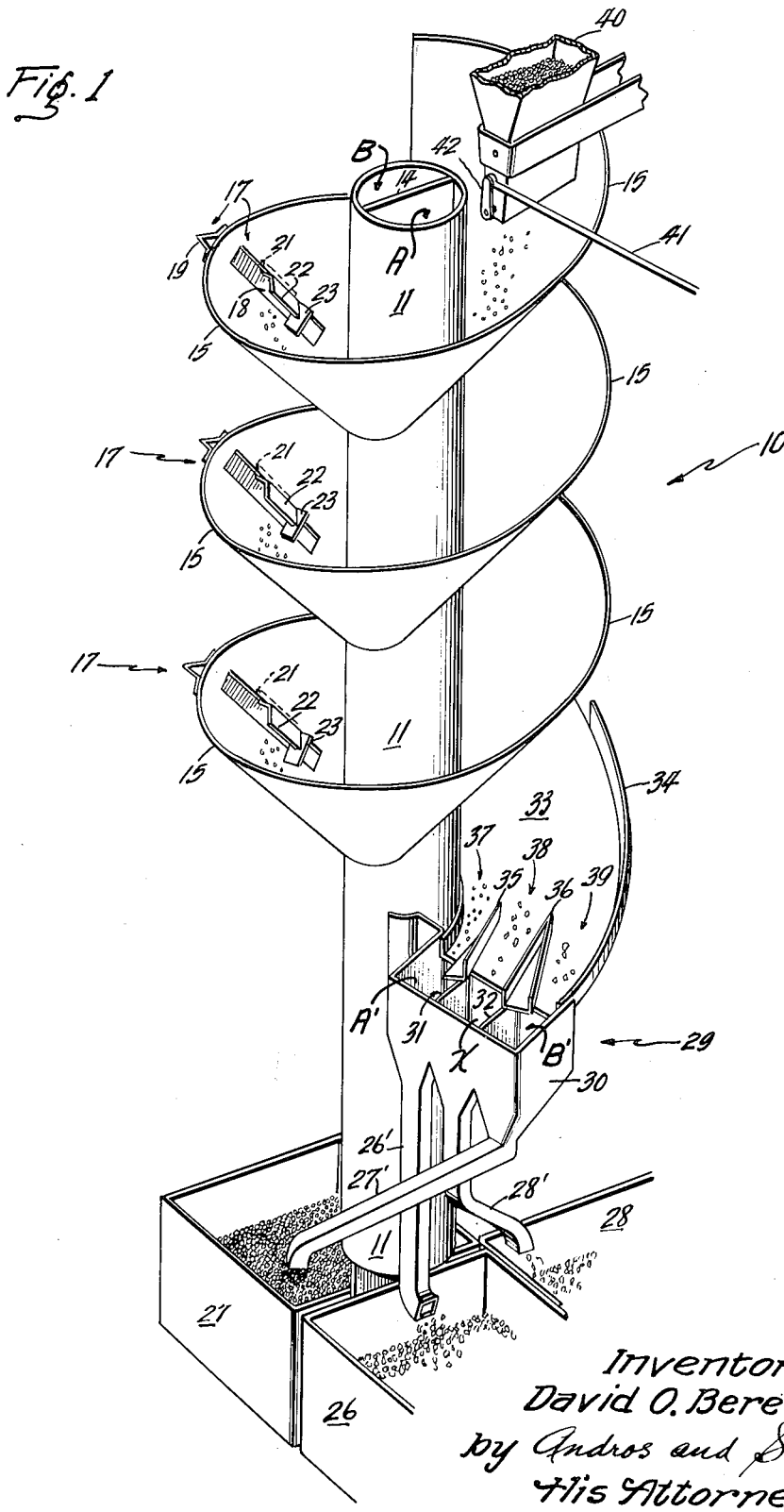
Inventor
David O. Beresford
by Andros and Smith
His Attorneys Nov. 22, 1955  D. O. BERESFORD  2,724,498
DEVICE FOR SEPARATING MIXED MASSES OF SPHERICAL
AND IRREGULARLY SHAPED BODIES SUCH AS
SEEDS, GRAINS AND THE LIKE
Filed Nov. 18, 1954 2 Sheets-Sheet 2
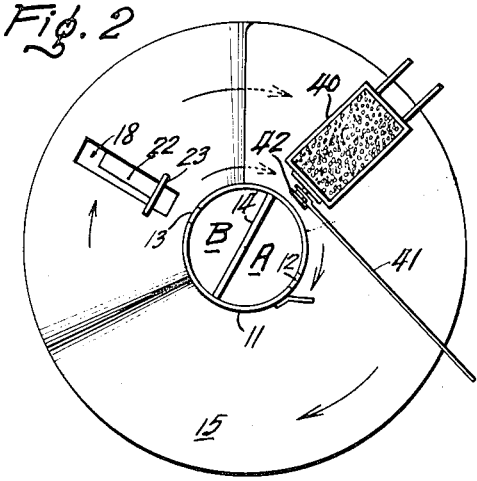
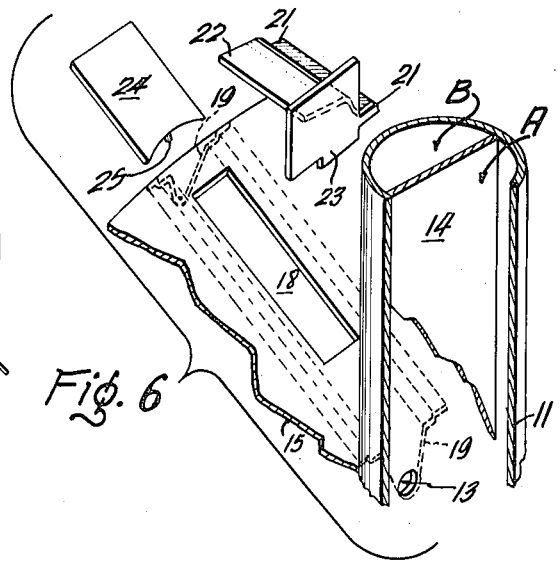
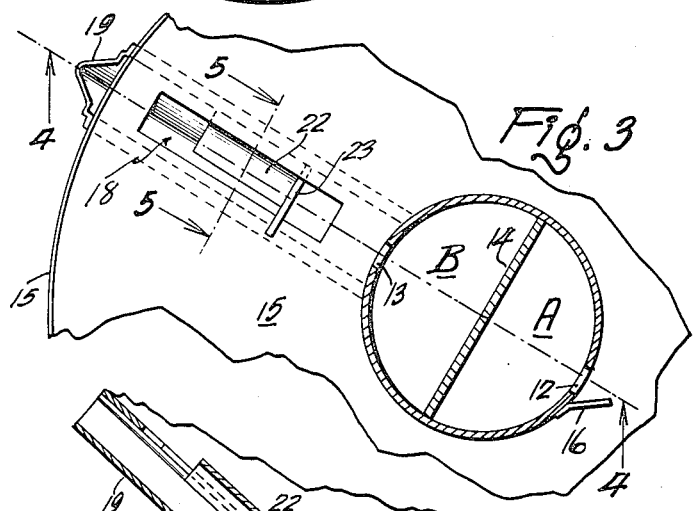
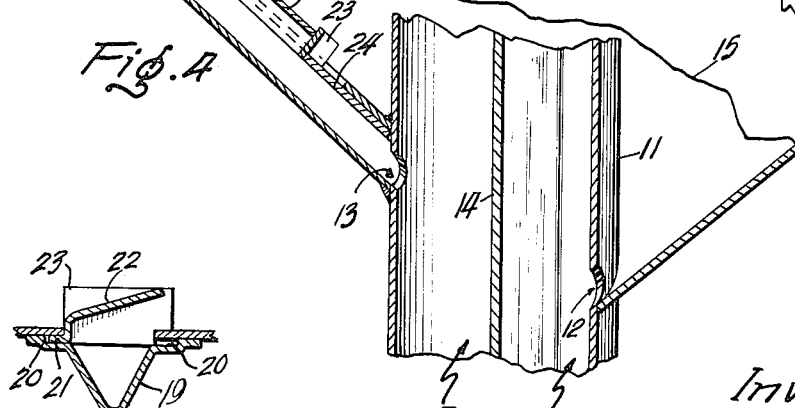
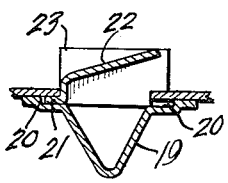
Inventor
David O. Beresford
by Andros and Smith
His Attorneys

United States Patent Office 2,724,498
Patented Nov. 22, 1955

2,724,498

DEVICE FOR SEPARATING MIXED MASSES OF SPHERICAL AND IRREGULARLY SHAPED BODIES SUCH AS SEEDS, GRAINS AND THE LIKE

David O. Beresford, Delanson, N. Y.

Application November 18, 1954, Serial No. 469,801

9 Claims. (Cl. 209—112)

This invention relates to an improved type of gravity feeding device for selectively separating a mixed mass of irregularly shaped and spherically shaped bodies from each other. More specifically, it pertains to such a device that utilizes a novel structural arrangement of parts, which comprises the combination of a spiral selector and compartmental collector, primarily for separating spherical and irregularly shaped grain, or seed, such as trefoil from clover, and the like, and the provision of such a device is the principal object of the invention.

I am well aware that gravity separators have appeared on the market, as well as having been suggested in the patented and other literature, but all of such devices, besides being cumbersome, bulky and expensive, do not, for example, give a reliable "purity," or percentage separation of at least 95.5 per cent as required by modern day standards.

A solution to this problem with its attendant difficulties and disadvantages has long been sought and demanded by the seed and grain industry, and this has now been accomplished by means of the present invention, wherein percentage separations as high as 99.9 per cent have been attained.

Generally, therefore, besides solving said problem, it is also an object of the invention to provide such a gravity feed seed separating device that is economical of manufacture, simple yet sturdy, compact, and durable of construction, and which will operate with relative freedom from wear and tear or mechanical difficulties, and is otherwise well suited to the purposes for which it is intended.

More specifically, it is an object of the invention to provide a device for selectively separating a mixed mass of irregularly shaped and spherically shaped bodies, such as seeds and grains, from each other, gravitationally by means of a tubular member, longitudinally divided into compartments, and having spaced-apart openings arranged intermediate its ends and communicating with such compartments, a spiral chute disposed around such member angularly to its longitudinal axis, inwardly disposed baffle means along the member and chute adjacent those openings communicating with one of such compartments, and outwardly disposed baffle means along the chute communicating with openings of the other of such compartments, in order separately to retrieve or capture the irregularly shaped and spherically shaped bodies.

Other specific objects of the invention comprise the provision of such a device in which the first baffle means consists of a plate secured to the tubular member and chute along a line on the flight of the chute immediately past the opening communicating with one compartment; in which such compartments are preferably provided by a central partition secured longitudinally within the tubular member; in which the outwardly disposed baffle means includes an opening through the chute and a gutter underlying the opening communicating with the openings of the other of such compartments; in which the outwardly disposed baffle is laterally adjustable to permit the passage of intermediate irregularly shaped bodies for subsequent collection; and means at the end of the chute for retrieving any such bodies that have by-passed such means and routing and collecting the same with similar bodies that have previously passed through said compartments.

Other objects of the invention will in part be obvious and will in part appear hereinafter.

The invention accordingly comprises the features of construction, combination of elements, and arrangement of parts, which will be exemplified in the construction hereinafter set forth and scope of the application of which will be indicated in the claims.

For a fuller understanding of the nature and objects of the invention reference should be had to the following detailed description, taken in connection with the accompanying drawings, in which:

Fig. 1 is a perspective view of a preferred form of device embodied by the invention;

Fig. 2 is a top view of the device shown in Fig. 1;

Fig. 3 is a fragmentary, sectional top view, considerably enlarged for clarity in illustration, of what is depicted in Fig. 2;

Fig. 4 is a vertical sectional view of a fragmentary portion of the device taken along the lines 4—4 of Fig. 3, and looking in the direction of the arrows;

Fig. 5 is a transverse sectional view of the outwardly disposed and laterally adjustable baffle plate and gutter taken along the lines 5—5 of Fig. 3, and looking in the direction of the arrows;

Fig. 6 is an exploded perspective view, partly in section, of a fragmentary portion of the device shown in Fig. 3, primarily illustrating the outwardly disposed baffle means and collecting compartments; and Fig. 7 is a fragmentary portion of the device, partly in section, showing the location of the inwardly disposed baffle means.

Mixed masses of irregularly shaped and spherical bodies of the same or different weights, for example, include wild peas, cockle, vetch, wheat, oats, barley, rye, clover, trefoil, or any kind of grain or seed that may have considerable impurities therein. Primarily, I am concerned with the removal or separation of trefoil seed which is almost spherical and the most desirable to retrieve, and the device or apparatus disclosed by way of illustration in the accompanying drawings was initially designed, built and operated for this purpose. Also, that principle is employed in which the faster moving or rolling spherical bodies will tend to run outwardly along each flight of the spiral, whereas the slower moving irregularly shaped bodies will tend to approach or even hug or cling to the tubular member 11.

Referring more particularly to the drawings, there is indicated generally at 10 a preferred form of device embodied by the invention. This comprises a tubular member or stack 11 that is longitudinally divided into at least two compartments, namely, A and B. Preferably, this and the other associated structure is largely made of galvanized sheet metal.

The tubular member or pipe has spaced-apart openings 12 along one side thereof which communicate with the compartment A, and similar openings 13 communicating with the compartment B. Preferably, these compartments are provided by a central longitudinal partition 14.

A spiral chute or runway 15 is disposed around the tubular member 11, preferably being secured thereto by welding, and each flight of the spiral being inclined to the longitudinal axis of the tubular member passing below each of the openings 12 and 13, at an angle approximately that illustrated in the drawing.

Inwardly disposed baffle means, for example, plates 16 are situated along the tubular member 11, and the chute or runway 15, being secured in any suitable manner thereto in abutting relation along a line on the chute immediately past the openings 12 communicating with the compartment A.

A second set of baffle means 17 are outwardly and laterally disposed above and below each flight of the chute, preferably directly opposite the baffle means 16. This second baffle means includes an opening 18 in the chute, and a gutter 19 underlying the opening which communicates with the other of said compartments B. The gutter 19 is secured to the underside of the chute 15, but is slightly spaced therefrom adjacent the transverse marginal edges of the openings 18 as at 20 to provide tracks for the foot 21 of an angular baffle plate 22 provided at one end thereof with a deflecting plate 23.

The baffle plate 22 is laterally adjustable transversely of the flight of the chute. When, for example, the same is moved outwardly, a portion of the opening 18 overlying the gutter 19 would be exposed and this would be undesirable. Therefore, one or more spacer plates 24, that may be arcuately cut away as at 25 if it abuts the tubular member 11, is slipped into the track 20 to cover so much of the opening 18. Various lengths of spacer plates may be used commensurate in length with the distance it is desired outwardly or laterally to move the baffle plate 22. Where, for example, it is desired merely to separate spherical bodies from irregular bodies into two different grades of seed, such spacer plates 24 will not be necessary. In this event, the baffle plate 22 will take a position such that the deflecting plate is approximately in line with the edge of the baffle plate 16. All this will more fully appear hereinafter in connection with a brief resume of the operation of the device. However, when the baffle plate 22 is laterally spaced away from the tubular member 11, it will be obvious that the most spherical seeds will be trapped by the outwardly disposed baffle means, and the least spherical seeds will be caught by the baffle plate 16. However, there then will be room to permit seeds of an intermediate nature to pass between both baffle means to be subsequently retrieved as later described.

At the bottom of the tubular member are three collecting bins 26, 27 and 28. The bin 26 underlies the opening through the compartment A and the bin 27 underlies the opening through the compartment B. As illustrated, the bin 26 will receive the more irregularly shaped seeds and the bin 27 will receive the more spherically shaped seeds after they drop through the compartments A and B respectively. However, certain of the differently shaped seeds in any case will always by-pass or escape the several different baffle means, and this is true when the baffle plate 22 is outwardly spaced when it is desired to secure at least three grades of seeds. Therefore, means indicated generally at 29 are employed at the end of the spiral 15 to collect such seeds and route them to their respective bins. This is accomplished by securing to the bottom of the spiral a collecting hopper 30 having three compartments, namely, A', B' and X provided by transverse partitions 31 and 32.

It will be observed that the bottom end of the spiral 33 is flattened out, that is to say, it is approximately normal, rather than inclined, to the longitudinal axis of the tubular member 11. Along one side of the flattened portion 33 is a seed confining rib or wall 34 to prevent the seeds from rolling off the chute or runway in this area. Secured to the marginal end of the portion 33 of the chute 15 are two deflecting members 35 and 36. The member 35 overlies the compartment A', and the member 36 overlies the compartment B'. Each of these members provide gate-ways 37, 38 and 39 respectively communicating with the compartments A', X and B'. At the bottom of the compartment A' is a conduit 26' overlying the bin 26. At the bottom of the compartment X is a conduit 28' overlying the bin 28. Likewise, at the bottom of the compartment 13' is a conduit 27' extending over the bin 27. All of these conduits will route such seeds, that have escaped either of the baffle means, to their proper bins.

In operation, assuming that a mixed mass of seed or grain has been placed, for example, in a hopper 40 on an upper floor, and it is desired to segregate the same, it is but necessary to actuate the lever 41 pivotally connected to the connecting link 42 which in turn is connected to a gate (not shown) in the bottom of the hopper. The mixed seeds will fall into the first flight of the spiral and the slowest moving seeds will largely be deflected by the baffle 16 through the openings 12 and downwardly through compartment A and into the bin 26. The faster moving spherical seeds will tend to move outwardly toward the lip of each flight of the spiral but will be prevented from going over the edge because of the angular inclination of each flight of the spiral. However, they will be deflected by the baffle 22, drop into the openings 18, into the gutters 19, then down through the openings 13 and through the compartment B, where they will fall into the bin 27. Assuming that the baffle plate 22 has been moved outwardly or laterally in the tracks 20, and the spacer plate 24 has been positioned over the inner portion of the opening 18, seeds of an intermediate shape will pass along the flights of the runway of the spiral 15, between the baffle plates 16 and 22 and continue through the gate-way 38 into the compartment X of the lower hopper 30 and downwardly through the conduit 28' into the bin 28.

Certain of the very irregular seeds that have escaped the baffle 16 will continue down the flights of the spiral 15 and pass through the gate-way 37 into the compartment A' through the conduit 26' and into the bin 26 to join their earlier arrived companions that have passed through the compartment A into the bin 26. Likewise, those spherical seeds that have escaped the baffle 22 will continue down the flights of the runway, enter the gate-way 39, drop into the compartment B', pass into the conduit 27' to join their earlier arrived companions that have previously passed through the compartment B to enter the bin 27.

It will thus be seen that the objects hereinbefore set forth may readily and efficiently be attained by the utilization of such novel structure functioning as that above described.

Since certain changes may be made in the above construction and different embodiments of the invention could be made without departing from the scope thereof, it is intended that all matter contained in the above description, or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. In a device for selectively separating a mixed mass of irregularly shaped and substantially spherically shaped bodies from each other by gravitationally feeding the same therethrough, the improvement comprising in combination a tubular member, longitudinally divided into compartments, and having spaced-apart openings arranged intermediate its ends and communicating with said compartments; a spiral chute, disposed around said member angularly to its longitudinal axis; inwardly disposed baffle means along said member and chute adjacent those openings communicating with one of said compartments; and outwardly disposed baffle means along said chute communicating with those openings of the other of said compartments; whereby separately to capture said irregularly shaped and spherically shaped bodies respectively.

2. In a device as defined in claim 1, and further characterized in that said inwardly disposed baffle means comprises a plate secured to said member, and to said chute, along a line on the flight of the chute immediately past the opening communicating with said one compartment.

3. In a device as defined in claim 1, and further characterized in that said compartments are provided by means of a central partition secured longitudinally within said tubular member.

4. In a device for selectively separating a mixed mass of irregularly shaped and substantially spherically shaped bodies from each other by gravitationally feeding the same therethrough, the improvement comprising in combination a tubular member, longitudinally divided into compartments, and having spaced-apart openings arranged intermediate its ends and communicating with said compartments; a spiral chute, disposed around said member angularly to its longitudinal axis; inwardly disposed baffle means along said member and chute adjacent those openings communicating with one of said compartments; and outwardly and laterally disposed baffle means, including an opening through said chute and a gutter underlying said opening, communicating with those openings of the other of said compartments; whereby separately to capture said irregularly shaped and spherically shaped bodies respectively.

5. In a device as defined in claim 4, and further characterized in that said outwardly disposed baffle means includes a baffle plate overlying said gutter and slidably adjustable thereover, and over said opening, transversely of said chute laterally, and in spaced relation to said inwardly disposed baffle means; whereby to provide for the passage therebetween along said chute of bodies that are of an intermediate irregular shape relative to said irregular and spherical bodies.

6. In a device according to claim 5, and wherein a spacer member is provided to close a portion of said opening in said chute overlying said gutter commensurate in length with the distance said baffle plate is moved laterally.

7. In a device according to claim 5, and wherein there is provided means at the end of said chute separately to capture said intermediate irregularly shaped bodies.

8. In a device according to claim 5, and wherein there is provided separate means at the end of said chute to capture irregularly shaped bodies intended for said first compartment, but escaping said inwardly spaced baffle means, and collecting the same together with said similar irregularly shaped bodies passing through said first compartment.

9. In a device according to claim 5, and wherein there is provided separate means at the end of said chute to capture spherical bodies intended for said other compartment, but escaping said outwardly spaced baffle means, and collecting the same together with similar shaped spherical bodies passing through said other compartment.

References Cited in the file of this patent

UNITED STATES PATENTS

| 819,252 | Pollock | May 1, 1906 |
| 1,283,896 | Reap et al. | Nov. 5, 1918 |
| 1,959,736 | Rademacher | May 22, 1934 |

FOREIGN PATENTS

| 450,853 | France | Jan. 29, 1913 |